United States Patent
Tsai et al.

(10) Patent No.: US 11,284,417 B2
(45) Date of Patent: Mar. 22, 2022

(54) SCHEDULING BASED ON AVAILABLE TRANSMIT POWER AND CHANNEL STATE

(71) Applicant: QUALCOMM Incorporated, San Diego, CA (US)

(72) Inventors: Shiau-He Tsai, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/843,654

(22) Filed: Apr. 8, 2020

(65) Prior Publication Data

US 2020/0329485 A1 Oct. 15, 2020

Related U.S. Application Data (60) Provisional application No. 62/832,774, filed on Apr. 11, 2019.

(51) Int. Cl.
H04W 72/12 (2009.01)
H04W 72/04 (2009.01)
(Continued)

(52) U.S. Cl.
CPC ...... H04W 72/1257 (2013.01); H04B 7/0413 (2013.01); H04L 1/0003 (2013.01);
(Continued)

(58) Field of Classification Search
CPC ... H04L 1/0003; H04L 1/0026; H04L 5/0048; H04L 5/0051; H04L 25/0226;
(Continued)

(56) References Cited

U.S. PATENT DOCUMENTS 10,021,693 B1 7/2018 Pawar et al.
2014/0329551 A1* 11/2014 Ryoo ............... H04W 76/27
455/522
(Continued)

FOREIGN PATENT DOCUMENTS

EP 2525618 A2 11/2012

OTHER PUBLICATIONS

International Search Report and Written Opinion—PCT/US2020/027504—ISAEPO—dated Aug. 31, 2020.

*Primary Examiner* — Pao Sinkantarakorn
(74) *Attorney, Agent, or Firm* — Patterson+ Sheridan, L.L.P.

(57) ABSTRACT

Certain aspects of the present disclosure provide a method for wireless communication by a base station (BS). The method generally includes receiving an indication of current remaining available transmit power from a user equipment (UE). The method further includes communicating information indicating a data rate parameter and a communication configuration to the UE. The data rate parameter is for use by the UE on an uplink with the BS. The communication configuration affects uplink transmission duty cycle on the uplink based on whether the current remaining available transmit power and a current channel state between the BS and the UE satisfy a condition. The method further includes receiving signals based on the data rate parameter and the communication configuration from the UE on the uplink.

36 Claims, 4 Drawing Sheets

(51) Int. Cl.
*H04L 1/00* (2006.01)
*H04L 5/00* (2006.01)
*H04B 7/0413* (2017.01)
*H04L 25/02* (2006.01)

(52) U.S. Cl.
CPC ........ *H04L 5/0051* (2013.01); *H04L 25/0226* (2013.01); *H04W 72/0473* (2013.01)

(58) Field of Classification Search
CPC ....... H04W 52/24–248; H04W 52/262; H04W 52/265; H04W 52/365; H04W 52/367; H04W 72/0473; H04W 72/1257
See application file for complete search history.

(56) References Cited

U.S. PATENT DOCUMENTS

| | | |
|---|---|---|
| 2018/0167897 A1 | 6/2018 | Sampath et al. |
| 2018/0279348 A1* | 9/2018 | Huang .................. H04W 76/27 |
| 2020/0145927 A1* | 5/2020 | Sun ..................... H04W 72/048 |
| 2020/0323031 A1* | 10/2020 | Nakamura .......... H04W 72/042 |
| 2021/0029652 A1* | 1/2021 | Li ........................ H04W 52/14 |

* cited by examiner

SCHEDULING BASED ON AVAILABLE TRANSMIT POWER AND CHANNEL STATE

CLAIM OF PRIORITY UNDER 35 U.S.C. § 119

The present application for Patent claims the benefit of U.S. Provisional Patent Application Ser. No. 62/832,774, filed Apr. 11, 2019, assigned to the assignee hereof and hereby expressly incorporated by reference herein.

INTRODUCTION

Aspects of the present disclosure relate to wireless communications, and more particularly, to techniques for scheduling transmission by a wireless device on a wireless link.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a base station (BS). The method generally includes receiving an indication of current remaining available transmit power from a user equipment (UE). The method further includes communicating information indicating a data rate parameter and a communication configuration to the UE. The data rate parameter is for use by the UE on an uplink with the BS. The communication configuration affects uplink transmission duty cycle on the uplink based on whether the current remaining available transmit power and a current channel state between the BS and the UE satisfy a condition. The method further includes receiving signals based on the data rate parameter and the communication configuration from the UE on the uplink.

Certain aspects provide a BS comprising a memory and a processor coupled to the memory, the processor and memory being configured to receive an indication of current remaining available transmit power from a user equipment (UE). The processor and memory are further configured to communicate information indicating a data rate parameter and a communication configuration to the UE. The data rate parameter is for use by the UE on an uplink with the BS. The communication configuration affects uplink transmission duty cycle on the uplink based on whether the current remaining available transmit power and a current channel state between the BS and the UE satisfy a condition. The processor and memory are further configured to receive signals based on the data rate parameter and the communication configuration from the UE on the uplink.

Certain aspects provide a BS. The BS generally includes means for receiving an indication of current remaining available transmit power from a user equipment (UE). The BS further includes means for communicating information indicating a data rate parameter and a communication configuration to the UE. The data rate parameter is for use by the UE on an uplink with the BS. The communication configuration affects uplink transmission duty cycle on the uplink based on whether the current remaining available transmit power and a current channel state between the BS and the UE satisfy a condition. The BS further includes means for receiving signals based on the data rate parameter and the communication configuration from the UE on the uplink.

Certain aspects provide a non-transitory computer-readable medium that comprises instructions that when executed by a wireless device, cause the wireless device to perform a method for wireless communication by a BS. The method generally includes receiving an indication of current remaining available transmit power from a user equipment (UE).

The method further includes communicating information indicating a data rate parameter and a communication configuration to the UE. The data rate parameter is for use by the UE on an uplink with the BS. The communication configuration affects uplink transmission duty cycle on the uplink based on whether the current remaining available transmit power and a current channel state between the BS and the UE satisfy a condition. The method further includes receiving signals based on the data rate parameter and the communication configuration from the UE on the uplink.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the BS described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for determining and/or communicating a data rate parameter and a communication configuration affecting transmission duty cycle for use by a wireless device for communicating on a wireless link. The data rate parameter and communication configuration are based on a remaining available transmit power of the wireless device and a channel state of the wireless link.

For example, a UE may be configured with a maximum transmit power (e.g., power headroom) that the UE is allowed to use to transmit signals on an uplink to a BS. The maximum transmit power may be an average maximum transmit power calculated over a time period, meaning the average power used by the UE over the period of time should not exceed the maximum transmit power. In certain aspects, the UE is configured to transmit an indication of its current remaining available transmit power (e.g., a power headroom report (PHR)) to the BS, meaning the remaining power the UE has left after accounting for the current signals it is scheduled to transmit. Certain aspects herein refer to a PHR indicating a power headroom as an example, but it should be noted that the aspects may similarly apply to other indications of current remaining available transmit power. The current remaining available transmit power indicates how much transmission power the UE has left to use for transmission on the uplink (UL) in addition to the power being used for currently scheduled transmissions.

In certain aspects, the UE is also configured to transmit an indication of current channel state to the BS, or the BS otherwise determines a current channel state of a wireless link, such as a channel, between the UE and the BS. For example, the BS may transmit reference signals to the UE on a downlink, and the UE may measure the reference signals. The UE may transmit to the BS a downlink signal report, which may comprise a reference signal received power (RSRP) report that indicates the power at which the UE received the reference signals. The BS may determine the current channel state of the wireless link from the RSRP report, such as an increasing RSRP over time indicating improving pathloss, and a decreasing RSRP over time indicating degrading pathloss on the wireless link. Certain aspects herein refer to a RSRP indicating current channel state as an example, but it should be noted that the aspects may similarly apply to other indications of current channel state.

In certain aspects, the BS is configured to utilize the current remaining available transmit power of the UE and the current channel state between the BS and UE to determine a data rate at which the UE should encode data and transmit it to the BS on the wireless link. For example, the BS determines a modulation and coding scheme (MCS) indicative of a data rate and transmits an indication (e.g., MCS index value) of the MCS to the UE. A higher MCS results in a higher data rate of transmission by the UE, but such transmissions are more susceptible to pathloss. A lower MCS results in a lower data rate of transmission by the UE, but such transmissions are less susceptible to pathloss. The BS is further configured to utilize current remaining available transmit power of the UE and the current channel state between the BS and UE to determine a communication configuration affecting uplink transmission duty cycle on the uplink for the UE. For example, the BS determines a communication configuration that affects a time duration for which the UE transmits UL control information to the BS per time period.

In certain aspects the BS configures the UE to communicate on the uplink using the data rate and the communication configuration. For example, the BS configures the UE such as to meet certain transmit power limits and to account for pathloss between the BS and UE, as further discussed herein.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Figure 1:
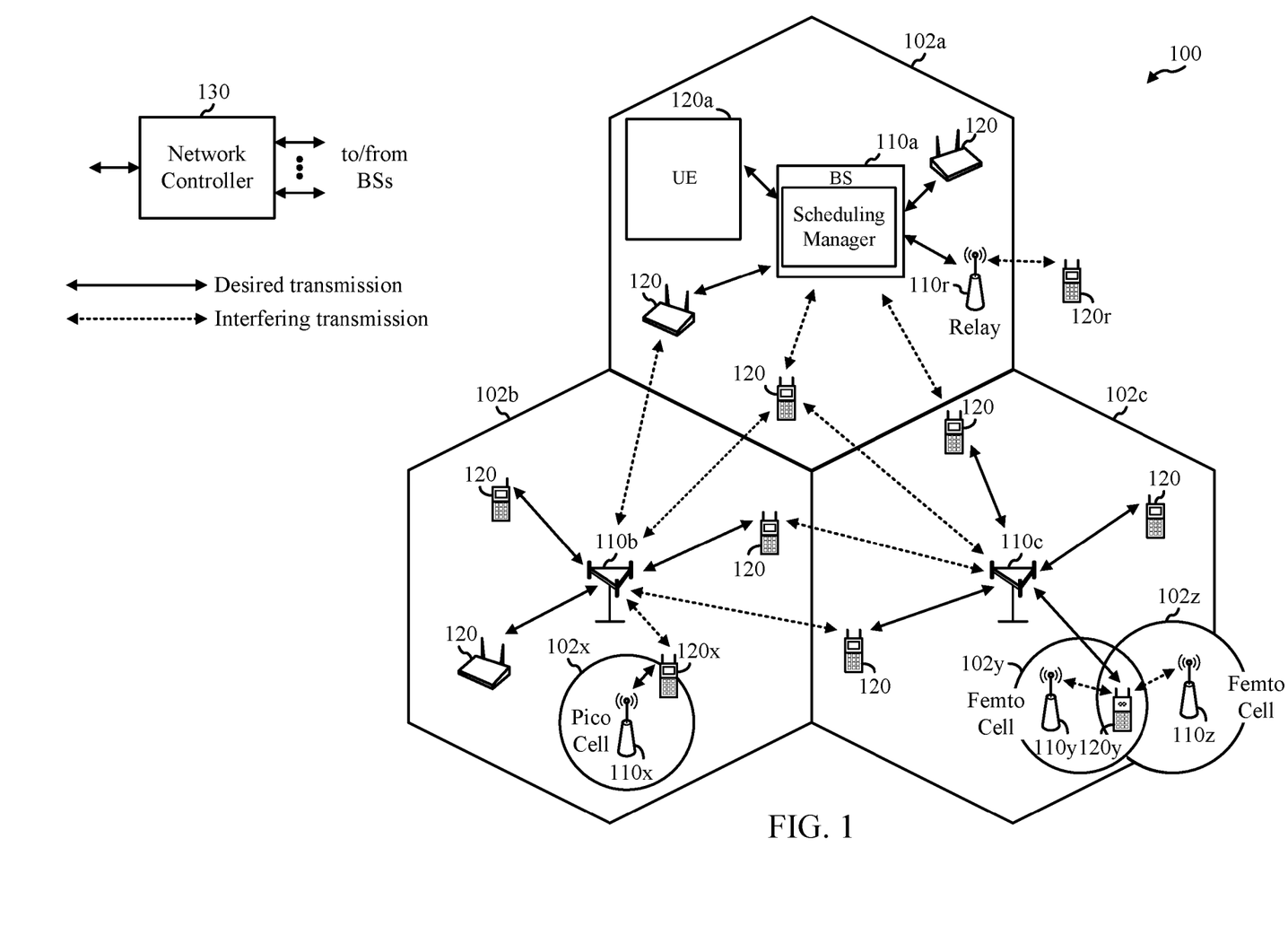
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network). For example, as shown in FIG. 1, the BS 110a has a scheduling manager that may be configured for determining and/or communicating a data rate parameter and a communication configuration affecting transmission duty cycle for a wireless device to use to communicate on a wireless link based on a remaining available transmit power of the wireless device and a channel state of the wireless link, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
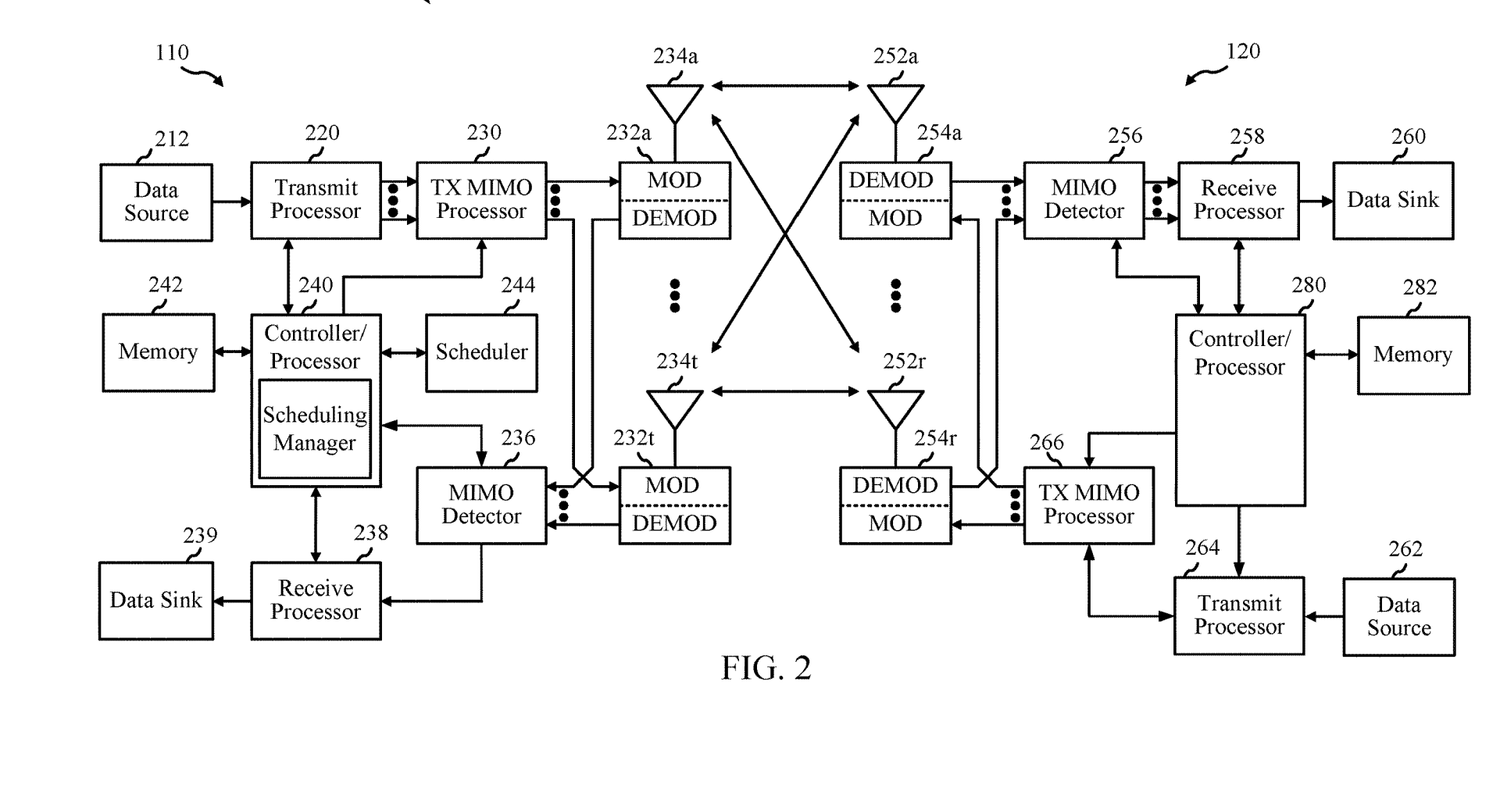
FIG. 2 illustrates example components of a BS and a UE, in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a scheduling manager that may be configured for determining and/or communicating a data rate parameter and a communication configuration affecting transmission duty cycle for a wireless device to use to communicate on a wireless link based on a remaining available transmit power of the wireless device and a channel state of the wireless link, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Scheduling

For NR wireless communication networks, and any other wireless communication networks with high carrier frequencies and corresponding short wavelengths used for communication, more antenna array dimensions can be used for larger beamforming gains, which results in high directivity of transmitted power.

In certain cases, it may be desirable to limit the amount of power exposure of, for instance, the human body. For example, the Federal Communications Committee (FCC) has set a maximum permissible exposure (MPE) limit for the human body from a device, such as a wireless device (e.g., UE 120). The MPE limit indicates a maximum average power density (PD) in units of Watts per square centimeter over a time span (e.g., 4 seconds).

In certain aspects, the MPE limit can constrain the transmit power that can be used by UE 120 when beamforming transmissions from the UE 120 to the BS 110, such as when a human body is near the UE 120. For example, the UE 120 may continuously transmit signals at a low transmit power to meet the MPE limit. However, a low transmit power may lead to a restricted range of transmission for a signal and/or a reduction in a data rate at which data can be encoded in the signal transmitted to the BS 110 and successfully decoded by the BS 110.

For example, a wireless channel between UE 120 and BS 110 may be susceptible to pathloss, where signals transmitted on the channel are attenuated. The amount of pathloss on the channel is based on the channel state/quality of the channel. If the original transmit power of the signal is low and the data rate for encoding information high, the attenuation from the pathloss may decrease a signal to noise ratio (SNR) at which the signal is received by the BS 110 to a point that the BS 110 cannot successfully decode the information encoded in the signal. The UE 120 can one or both of increase the power used to transmit the signal to increase the SNR at the BS 110, or encode the information in the signal at a lower data rate (e.g., with additional error correction) such that the BS 110 can successfully decode the information encoded even at a lower SNR. However, the UE 120 may be constrained from increasing the transmit power used due to the MPE limit, and that may result in a low data rate for transmission, which may not be desirable.

Accordingly, certain aspects provide techniques for UE 120 to transmit to BS 110 at a relatively higher transmit power and corresponding higher data rate for less duration of a time period (e.g., at a lesser duty cycle) to meet the MPE limit than the relatively lower transmit power and corresponding lower data rate it would need to use for transmitting over a greater duration of the time period (e.g., at a greater duty cycle) to meet the MPE limit. In particular, as discussed, the MPE limit is based on an average power exposure over a time period.

The UE 120 may be configured with a maximum transmit power (e.g., power headroom) that the UE 120 is allowed to transmit using on the uplink to the BS 110. The maximum transmit power may be an average maximum transmit power over a time period. The maximum transmit power may be based on the MPE limit. For example, the UE 120 may determine a distance from a human body (e.g., based on one or more sensors, approximation, etc.) and set its maximum transmit power so as to meet the MPE limit based on the determined distance.

In certain aspects, the UE 120 is configured to transmit to the BS 110 an indication of current remaining available transmit power (e.g., a PHR) of the UE 120. The UE 120 may periodically or aperiodically report (e.g., completely aperiodic, using semi-persistent scheduling (SPS), etc.) its current remaining available transmit power to the BS 110. The current remaining available transmit power reported to the BS 110 may increase or decrease from a previously reported remaining available transmit power for different reasons. As discussed, one reason that the current remaining available transmit power may change, such as decrease, is due to a UE 120 being constrained by a MPE limit, such as due to a human body being near the UE 120. In particular, the UE 120 may lower its current remaining available transmit power due to a lowered maximum transmit power due to the MPE limit.

Another reason that that the current remaining available transmit power reported by the UE 120 to BS 110 may change is based on a change in channel state between the UE 120 and the BS 110. For example, UE 120 may be configured to transmit UL control information to BS 110 on an uplink periodically or aperiodically. In certain aspects, the amount of power used by UE 120 to transmit UL control information to the BS 110 is based on channel state between the BS 110 and the UE 120. For example, the BS 110 may transmit reference signals to the UE 120, and the UE 120 may measure the reference signals. The UE 120 may have information indicating the power at which the reference signals were transmitted and measure the power at which the reference signals are received. Accordingly, the UE 120 can estimate channel state between the BS 110 and the UE 120. In certain aspects, the worse the channel state, the higher the transmit power the UE 120 uses to transmit the UL control information to the BS 110 to ensure the UL control information is received by the BS 110 and/or the lower the data rate that UE 120 uses to transmit to the BS 110 requiring more power. In particular, UE 120 may be configured to ensure that UL control information is likely to be received by the BS 110. For example, if the BS 110 does not receive the UL control information from the UE 120, it may declare a radio link failure (RLF) between the BS 110 and the UE 120, and shut down the link, thereby delaying data transfer.

Accordingly, based on poor channel state, the UE 120 uses more transmit power for transmitting UL control information, thereby using more of the maximum transmit power available at the UE 120. Accordingly, this leaves less of the transmit power available for other transmissions, such as data transmissions, on the uplink by UE 120. Thus, UE 120 reports a lower current remaining available transmit power to BS 110.

Based on the above, when BS 110 receives an indication of current remaining available transmit power from UE 120 that is less than a previously received remaining available transmit power, based on the indication alone, BS 110 may not be able to determine if UE 120 is experiencing pathloss that is changing the current remaining available transmit power and/or is power constrained at UE 120 itself (e.g., due to MPE limit) that is changing the current remaining available transmit power.

As discussed, in certain aspects, when UE 120 is power constrained at UE 120 itself, such as due to a MPE limit, it may be desirable for UE 120 to transmit to BS 110 at a relatively higher transmit power and corresponding higher data rate for less duration of a time period (e.g., at a lesser duty cycle) to meet the MPE limit than the relatively lower transmit power and corresponding lower data rate it would need to use for transmitting over a greater duration of the time period (e.g., at a greater duty cycle) to meet the MPE limit.

Further, BS 110 may be configured to determine a data rate and a communication configuration affecting transmission duty cycle for use by the UE 120. For example, in certain aspects, BS 110 is configured to indicate to UE 120 a data rate and a communication configuration affecting transmission duty cycle for use by the UE 120 based on whether the UE 120 is power constrained at UE 120 itself (e.g., due to MPE limit) or not. For example, if UE 120 is power constrained at UE 120 itself, BS 110 may configure UE 120 to use a higher data rate along with a communication configuration that results in a lower duty cycle.

However, as discussed, based on the indication of current remaining available transmit power from UE 120, BS 110 may not be able to determine if a change in current remaining available transmit power is due to power constraint at UE 120 itself or based on pathloss. Further, if a decrease in current remaining available transmit power is due to pathloss, it may not be desirable to decrease a duty cycle used for UL transmissions. For example, the UL control information transmitted by UE 120 to BS 110 may be useful for mobility of the UE 120, as based on the UL control information, the BS 110 can adjust communication parameters of the UE 120 to account for changes in channel state between the UE 120 and the BS 110. For example, the sooner that BS 110 gets UL control information from UE 120, the sooner it can account for worsening channel state between the UE 120 and BS 110 to avoid dropped traffic. Changing a duty cycle at which the UE 120 transmits to the BS 110 can affect how often UL control information is sent from the UE 120 to the BS 110. If the UE 120 is moving and undergoing increased pathloss, accordingly, it may not be desirable for the UE 120 to decrease a duty cycle used for transmissions.

Accordingly, certain aspects herein provide techniques for a BS to determine whether a UE is transmit power constrained due to a constraint at the UE itself, as opposed to another reason (e.g., pathloss), and based on that determination, the BS determines a data rate parameter and a communication configuration affecting transmission duty cycle for the UE to use to communicate on a wireless link. For example, in certain aspects, a BS is configured to determine if a change in current remaining available transmit power of a UE is based on whether the UE is power constrained at the UE itself, or based on pathloss, based on the current remaining available transmit power of the UE and a current channel state between the BS and the UE.

In certain aspects, BS 110 is configured to determine if a change in current remaining available transmit power of UE 120 is based on whether the UE 120 is power constrained at the UE 120 itself, or based on pathloss, based on the following condition [1]:

$$(PHR1 - PHR0 - (P\_PUSCH\_MCS1 - P\_PUSCH\_MCS0)) < (RSRP1 - RSRP0) + \delta \quad [1]$$

where,

PHR1 is a most recently received PHR from UE 120;

PHR2 is the most recently received PHR prior to PHR1;

P_PUSCH_MCS1 is the power headroom of UE 120 when using the MCS that PHR1 was calculated with respect to;

P_PUSCH_MCS0 is the power headroom of UE 120 when using the MCS that PHR0 was calculated with respect to;

RSRP1 is the most recently received RSRP from UE 120;

RSRP0 is the most recently received RSRP prior to RSRP1; and $\delta$ is an error correction term (e.g., 6 dB).

For example, if the above condition [1] is not satisfied (e.g., false), the BS 110 determines that the change in current remaining available transmit power of UE 120 is likely based on a power constraint at the UE 120 itself (e.g., due to MPE limit). Accordingly, the BS 110 may configure UE 120 to utilize a higher data rate and lower duty cycle for uplink transmission as further discussed herein. If the above condition [1] is satisfied (e.g. true), the BS 110 determines that the change in current remaining available transmit power of UE 120 is likely not based on a power constraint at the UE 120 itself, and instead is likely based on pathloss. Accordingly, the BS 110 may not configure UE 120 to utilize a higher data rate and lower duty cycle for uplink transmission as further discussed herein. Since the PHRs, P_PUSCH_MCSs, and RSRPs used in condition [1] are all the two most recently received from UE 120, they are all based on one or more conditions (e.g., channel conditions) that are related in time (e.g., calculated around the same time).

In certain aspects, condition [1] correlates change in current remaining available transmit power with change in channel state. For example, condition [1] correlates change in power headroom with change in RSRP at UE 120. For example, BS 110 determines that UE 120 is likely power constrained at the UE 120 itself when the change in power headroom (and correcting for the use of different MCSs) is greater than or equal to the change in RSRP (and correcting for error), meaning that the power headroom changes by a greater amount than RSRP. In particular, if PHR is not correlated with RSRP, BS 110 determines that UE 120 is likely power constrained at the UE 120 itself, and if PHR is correlated with RSRP, BS 110 determines that UE 120 is likely power constrained due to pathloss.

In certain aspects, condition [1] is useful in scenarios where the sampling of RSRP and PHR is relatively even, or where the change in RSRP and change in PHR is determined over relatively the same time period (e.g., where conditions such as channel conditions are related by in time by being at relatively the same time), such that performing a delta based between the two makes sense.

In certain aspects, BS 110 is configured to determine if a change in current remaining available transmit power of UE 120 is based on whether the UE 120 is power constrained at the UE 120 itself, or based on pathloss, based on other types of correlation between PHR and RSRP. For example, BS 110 may be configured to perform a correlation between a plurality of received PHRs from UE 120, and a plurality of received RSRPs from UE 120. In particular, if PHR is not correlated with RSRP, BS 110 determines that UE 120 is likely power constrained at the UE 120 itself, and if PHR is correlated with RSRP, BS 110 determines that UE 120 is likely power constrained due to pathloss. Various types of correlation techniques may be used such as a linear comparison, interpolation, cross correlation, etc.

In certain aspects, the correlation comprises if a rate of change of the plurality of PHRs differs from a rate of change of the plurality of RSRPs by less than a threshold. In particular, if they do not differ by less than the threshold, BS 110 determines that UE 120 is likely power constrained at the UE 120 itself, and if they do differ by less than the threshold, BS 110 determines that UE 120 is likely power constrained due to pathloss.

In certain aspects, when BS 110 determines that UE 120 is likely power constrained at the UE 120 itself and not due to pathloss, BS 110 is configured to determine a communication configuration affecting transmission duty cycle for the UE 120, and configure the UE 120 with the communication configuration such that the transmission duty cycle of UE 120 on the uplink is reduced. For example, BS 110 is configured to determine a communication configuration that indicates one or more of the following:

1) Use more/prioritize frequency domain resources (e.g., a wider frequency bandwidth) and use fewer/over time domain resources (e.g., that span a lesser period of time) for downlink data scheduling with the UE 120. Accordingly, the UE 120 will need to transmit fewer, and less frequently, hybrid automatic repeat request (HARQ) acknowledgment (ACK) packets to BS 110 on the uplink that acknowledge the downlink data transmitted from BS 110. For example, each HARQ-ACK packet may acknowledge transmission over a wider frequency bandwidth.

2) Reduce frequency/periodicity of UE 120 uplink channel measurement reporting (e.g., channel state information (CSI) reporting, RSRP reporting, etc.). Accordingly, the UE 120 will need to transmit fewer, and less frequently reports on the uplink. For example, the BS 110 can indicate to UE 120 to use a lower periodicity for reporting, or aperiodic triggering.

3) Reduce a number of resources (e.g., time resources) on which the UE 120 transmits sounding reference signal (SRS) to BS 110 on the uplink.

4) Reduce a MIMO dimensionality with which the UE 120 transmits SRS to BS 110 on the uplink, such that it contributes less percentage in average uplink power consumption.

Figure 3:
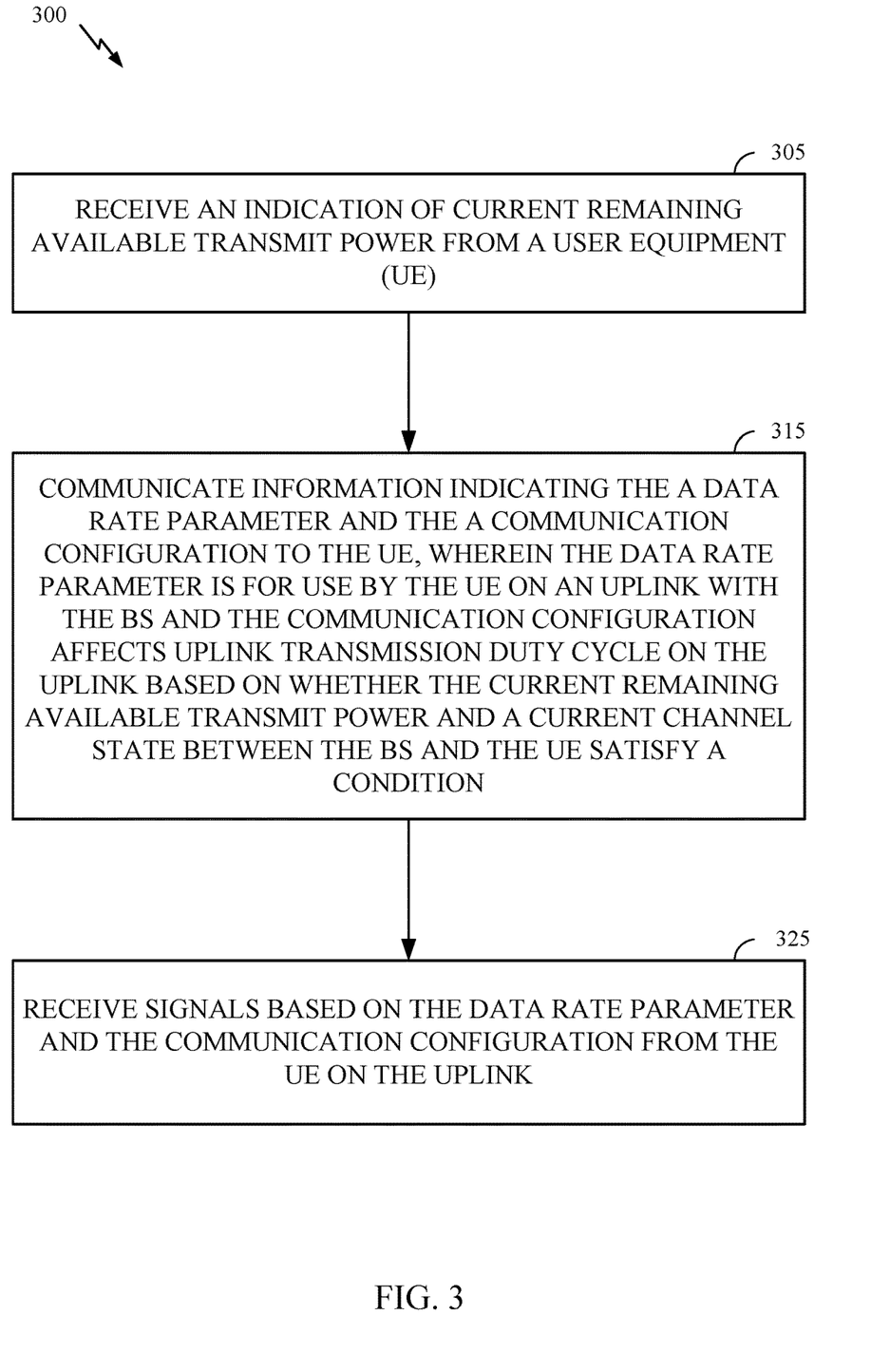
FIG. 3 is a flow diagram illustrating example operations for wireless communication by a BS, in accordance with certain aspects of the present disclosure.

FIG. 3 is a flow diagram illustrating example operations 300 for wireless communication, in accordance with certain aspects of the present disclosure. The operations 300 may be performed, for example, by a BS (e.g., such as a BS 110 in the wireless communication network 100). Operations 300 may be implemented as software components that are executed and run on one or more processors (e.g., controller/processor 240 of FIG. 2). Further, the transmission and reception of signals by the BS in operations 300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 300 may begin at 305 by BS 110 receiving an indication of current remaining available transmit power from UE 120. In certain aspects, the indication of current remaining available transmit power comprises a PHR. In certain aspects, the PHR indicates the current remaining available transmit power in terms of dB.

Continuing, at 315, BS 110 communicates information indicating a data rate parameter and a communication configuration to the UE 120, wherein the data rate parameter is for use by the UE 120 on an uplink with the BS 110 and the communication configuration affects uplink transmission duty cycle on the uplink based on whether the current remaining available transmit power and a current channel state between the BS 110 and the UE 120 satisfy a condition.

In certain aspects, BS 110 determines the current channel state by receiving a downlink signal report from the UE 120. In certain aspects, the downlink signal report comprises a reference signal received power report. In certain aspects, the RSRP indicates the power in terms of dB.

In certain aspects, the data rate parameter comprises a modulation and coding scheme index value. In certain aspects, the communication configuration comprises one or more of: a frequency bandwidth and set of time resources for receiving downlink signals from the BS 110, a schedule for reporting channel state (e.g., downlink channel state) on the uplink to the BS 110, a number of resources for transmitting sounding reference signals, or an uplink multiple-input multiple-output (MIMO) dimension for transmitting sounding reference signals.

At 325, the BS 110 receives signals based on the data rate parameter and the communication configuration from the UE 120 on the uplink.

In certain aspects, BS 110 determines the data rate parameter and the communication configuration based on whether the current remaining available transmit power and the current channel state satisfy the condition comprising the following: determining a first delta value based on a change between the current remaining available transmit power and a previous remaining available transmit power; determining a second delta value based on a change between the current channel state and a previous channel state; and determining if a comparison between the first delta value and the second delta value satisfy the condition. In certain such aspects, the condition comprises the first delta value minus a third delta value being less than the second delta value plus an error correction term, wherein the third delta value is based on a change in remaining available transmit power due to a change from a first modulation and coding scheme to a second modulation and coding scheme. In certain aspects, the first delta value and the second delta value are based on one or more conditions that are related in time.

In certain aspects, BS 110 determines the data rate parameter and the communication configuration based on whether the current remaining available transmit power and the current channel state satisfy the condition comprising the following: determining whether a correlation between a plurality of remaining available transmit powers and a plurality of channel states over time satisfy the condition, the plurality of remaining available transmit powers comprising the current remaining available transmit power and the plurality of channel states comprising the current channel state. In certain such aspects, the condition comprises if a rate of change of the plurality of remaining available transmit powers differs from a rate of change of the plurality of channel states by less than a threshold.

In certain aspects, BS 110 determines the data rate parameter and the communication configuration based on whether the current remaining available transmit power and the current channel state satisfy the condition comprising the following: when the condition is not satisfied, determining the data rate parameter as a first value corresponding to a first data rate and the communication configuration as a first configuration corresponding to a first duty cycle; and when the condition is satisfied, determining the data rate parameter as a second value corresponding to a second data rate and the communication configuration as a second configuration corresponding to a second duty cycle, wherein the first data rate is greater than the second data rate, and wherein the first duty cycle is less than the second duty cycle.

In certain aspects, the first configuration indicates to the UE to use a first frequency bandwidth and a first set of time resources for receiving downlink signals from the BS, the second configuration indicates to the UE to use a second frequency bandwidth and a second set of time resources for receiving downlink signals from the BS, the first frequency bandwidth is wider than the second frequency bandwidth, and the second set of time resources span a greater time period than the first set of time resources.

In certain aspects, the first configuration indicates to the UE to use a first schedule for reporting channel state on the uplink to the BS, the second configuration indicates to the UE to use a second schedule for reporting channel state on the uplink to the BS, and the second schedule indicates reporting more often than the first schedule. In certain such aspects, the second schedule indicates periodic reporting and the first schedule indicates aperiodic reporting. In certain such aspects, the first schedule indicates periodic reporting with a first periodicity and the second schedule indicates periodic reporting with a second periodicity that is greater than the first periodicity.

In certain aspects, the first configuration indicates to the UE to use a first number of time resources for transmitting sounding reference signals, the second configuration indicates to the UE to use a second number of time resources for transmitting sounding reference signals, and the first number of time resources is less than the second number of time resources.

In certain aspects, the first configuration indicates to the UE to use a first uplink MIMO dimension for transmitting sounding reference signals, wherein the second configuration indicates to the UE to use a second uplink MIMO dimension for transmitting sounding reference signals, and wherein the first uplink MIMO dimension is less than the second uplink MIMO dimension.

Figure 4:
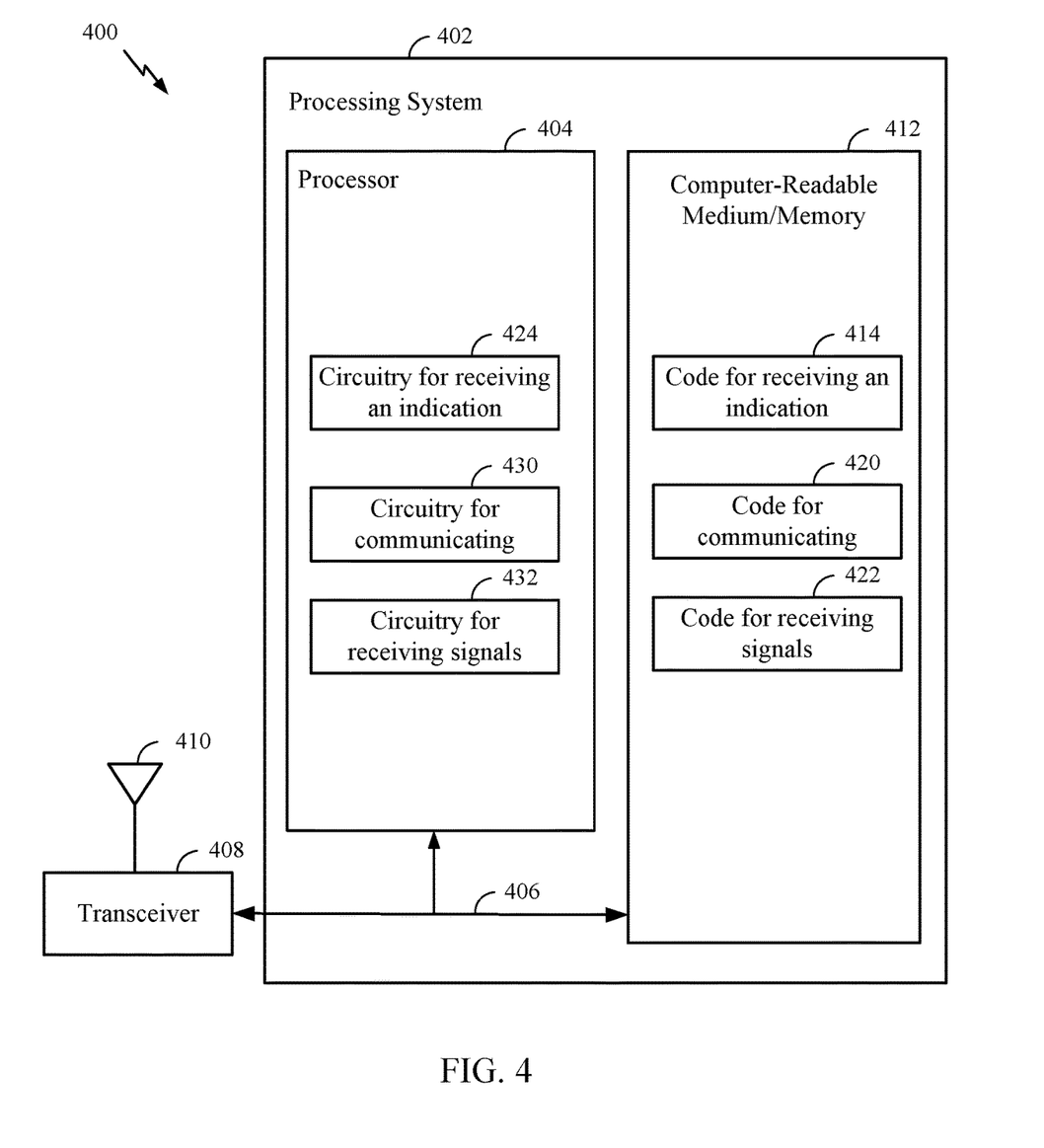
FIG. 4 illustrates a communications device that may include various components configured to perform operations for the techniques disclosed herein in accordance with aspects of the present disclosure.

FIG. 4 illustrates a communications device 400 that may include various components (e.g., corresponding to means-plus-function components) configured to perform operations for the techniques disclosed herein, such as the operations illustrated in FIG. 3. The communications device 400 includes a processing system 402 coupled to a transceiver 408. The transceiver 408 is configured to transmit and receive signals for the communications device 400 via an antenna 410, such as the various signals as described herein.

The processing system 402 may be configured to perform processing functions for the communications device 400, including processing signals received and/or to be transmitted by the communications device 400.

The processing system 402 includes a processor 404 coupled to a computer-readable medium/memory 412 via a bus 406. In certain aspects, the computer-readable medium/memory 412 is configured to store instructions (e.g., computer-executable code) that when executed by the processor 404, cause the processor 404 to perform the operations illustrated in FIG. 3, or other operations for performing the various techniques discussed herein for determining a data rate parameter and a communication configuration affecting transmission duty cycle for a wireless device to use to communicate on a wireless link based on a remaining available transmit power of the wireless device and a channel state of the wireless link. In certain aspects, computer-readable medium/memory 412 stores code for receiving an indication 414, code for communicating 420, and code for receiving signals 422. In certain aspects, the processor 404 has circuitry configured to implement the code stored in the computer-readable medium/memory 412. The processor 404 includes circuitry for receiving an indication 424, circuitry for communicating 430, and circuitry for receiving signals 432.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Example Aspects

Aspect 1: A method for wireless communication by a base station (BS), the method comprising: receiving an indication of current remaining available transmit power from a user equipment (UE); communicating information indicating a data rate parameter and a communication configuration to the UE, wherein the data rate parameter is for use by the UE on an uplink with the BS and the communication configuration affects uplink transmission duty cycle on the uplink based on whether the current remaining available transmit power and a current channel state between the BS and the UE satisfy a condition; and receiving signals based on the data rate parameter and the communication configuration from the UE on the uplink.

Aspect 2: The method of Aspect 1, wherein: when the condition is not satisfied, the data rate parameter is a first value corresponding to a first data rate parameter and the communication configuration is a first configuration corresponding to a first duty cycle; and when the condition is satisfied, the data rate parameter is a second value corresponding to a second data rate parameter and the communication configuration is a second configuration corresponding to a second duty cycle, wherein the first data rate parameter is greater than the second data rate parameter, and wherein the first duty cycle is less than the second duty cycle.

Aspect 3: The method of Aspect 2, wherein the first configuration indicates to the UE to use a first frequency bandwidth and a first set of time resources for receiving downlink signals from the BS, wherein the second configuration indicates to the UE to use a second frequency bandwidth and a second set of time resources for receiving downlink signals from the BS, wherein the first frequency bandwidth is wider than the second frequency bandwidth, and wherein the second set of time resources span a greater time period than the first set of time resources.

Aspect 4: The method of any of Aspects 2-3, wherein the first configuration indicates to the UE to use a first schedule for reporting channel state on the uplink to the BS, wherein the second configuration indicates to the UE to use a second schedule for reporting channel state on the uplink to the BS, and wherein the second schedule indicates reporting more often than the first schedule.

Aspect 5: The method of Aspect 4, wherein the second schedule indicates periodic reporting and the first schedule indicates aperiodic reporting.

Aspect 6: The method of Aspect 4, wherein the first schedule indicates periodic reporting with a first periodicity and the second schedule indicates periodic reporting with a second periodicity that is greater than the first periodicity.

Aspect 7: The method of any of Aspects 2-6, wherein the first configuration indicates to the UE to use a first number of time resources for transmitting sounding reference signals, wherein the second configuration indicates to the UE to use a second number of time resources for transmitting sounding reference signals, and wherein the first number of time resources is less than the second number of time resources.

Aspect 8: The method of any of Aspects 2-7, wherein the first configuration indicates to the UE to use a first uplink multiple-input multiple-output (MIMO) dimension for transmitting sounding reference signals, wherein the second configuration indicates to the UE to use a second uplink MIMO dimension for transmitting sounding reference signals, and wherein the first uplink MIMO dimension is less than the second uplink MIMO dimension.

Aspect 9: The method of any of Aspects 1-8, wherein whether the current remaining available transmit power and the current channel state satisfy the condition comprises whether a comparison between a first delta value and a second delta value satisfy the condition, wherein the first delta value is based on a change between the current remaining available transmit power and a previous remaining available transmit power, and wherein the second delta value is based on a change between the current channel state and a previous channel state.

Aspect 10: The method of Aspect 9, wherein the condition comprises the first delta value minus a third delta value being less than the second delta value plus an error correction term, wherein the third delta value is based on a change in remaining available transmit power due to a change from a first modulation and coding scheme to a second modulation and coding scheme.

Aspect 11: The method of any of Aspects 9-10, wherein the first delta value and the second delta value are based on one or more conditions that are related in time.

Aspect 12: The method of any of Aspects 1-11, wherein the communication configuration comprises one or more of: a frequency bandwidth and set of time resources for receiving downlink signals from the BS, a schedule for reporting channel state on the uplink to the BS, a number of resources for transmitting sounding reference signals, or an uplink multiple-input multiple-output (MIMO) dimension for transmitting sounding reference signals.

Aspect 13: The method of any of Aspects 1-12, further comprising receiving a downlink signal report from the UE, wherein the current channel state is based on the downlink signal report.

Aspect 14: The method of any of Aspects 1-13, wherein the data rate parameter comprises a modulation and coding scheme index value.

Aspect 15: The method of any of Aspects 1-14, wherein whether the current remaining available transmit power and the current channel state satisfy the condition comprises whether a correlation between a plurality of remaining available transmit powers and a plurality of channel states over time satisfy the condition, the plurality of remaining available transmit powers comprising the current remaining available transmit power and the plurality of channel states comprising the current channel state.

Aspect 16: The method of Aspect 15, wherein the condition comprises if a rate of change of the plurality of remaining available transmit powers differs from a rate of change of the plurality of channel states by less than a threshold.

Aspect 17: The method of Aspect 13, wherein the downlink signal report comprises a reference signal received power report.

Aspect 18: The method of any of Aspects 1-17, wherein the indication of current remaining available transmit power comprises a power headroom report (PHR).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 3.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), the method comprising:
   receiving an indication of current remaining available transmit power from a user equipment (UE);
   communicating information indicating a data rate parameter and a communication configuration to the UE, wherein:
      the data rate parameter is for use by the UE on an uplink with the BS and the communication configuration affects uplink transmission duty cycle on the uplink;
      the data rate parameter and the communication configuration are based on whether the current remaining available transmit power and a current channel state between the BS and the UE satisfy a condition;
      when the condition is not satisfied, the data rate parameter is a first value corresponding to a first data rate parameter and the communication configuration is a first configuration corresponding to a first duty cycle; and
      when the condition is satisfied, the data rate parameter is a second value corresponding to a second data rate parameter and the communication configuration is a second configuration corresponding to a second duty cycle, wherein the first data rate parameter is greater than the second data rate parameter, and wherein the first duty cycle is less than the second duty cycle; and
   receiving signals based on the data rate parameter and the communication configuration from the UE on the uplink.

2. The method of claim 1, wherein the first configuration indicates to the UE to use a first frequency bandwidth and a first set of time resources for receiving downlink signals from the BS, wherein the second configuration indicates to the UE to use a second frequency bandwidth and a second set of time resources for receiving downlink signals from the BS, wherein the first frequency bandwidth is wider than the second frequency bandwidth, and wherein the second set of time resources span a greater time period than the first set of time resources.

3. The method of claim 1, wherein the first configuration indicates to the UE to use a first schedule for reporting channel state on the uplink to the BS, wherein the second configuration indicates to the UE to use a second schedule for reporting channel state on the uplink to the BS, and wherein the second schedule indicates reporting more often than the first schedule.

4. The method of claim 3, wherein the second schedule indicates periodic reporting and the first schedule indicates aperiodic reporting.

5. The method of claim 3, wherein the first schedule indicates periodic reporting with a first periodicity and the second schedule indicates periodic reporting with a second periodicity that is greater than the first periodicity.

6. The method of claim 1, wherein the first configuration indicates to the UE to use a first number of time resources for transmitting sounding reference signals, wherein the second configuration indicates to the UE to use a second number of time resources for transmitting sounding reference signals, and wherein the first number of time resources is less than the second number of time resources.

7. The method of claim 1, wherein the first configuration indicates to the UE to use a first uplink multiple-input multiple-output (MIMO) dimension for transmitting sounding reference signals, wherein the second configuration indicates to the UE to use a second uplink MIMO dimension for transmitting sounding reference signals, and wherein the first uplink MIMO dimension is less than the second uplink MIMO dimension.

8. The method of claim 1, wherein whether the current remaining available transmit power and the current channel state satisfy the condition is based on whether a comparison between a first delta value and a second delta value satisfy the condition, wherein the first delta value is based on a change between the current remaining available transmit power and a previous remaining available transmit power, and wherein the second delta value is based on a change between the current channel state and a previous channel state.

9. The method of claim 8, wherein the condition comprises the first delta value minus a third delta value being less than the second delta value plus an error correction term, wherein the third delta value is based on a change in remaining available transmit power due to a change from a first modulation and coding scheme to a second modulation and coding scheme.

10. The method of claim 8, wherein the first delta value and the second delta value are based on one or more conditions that are related in time.

11. The method of claim 1, wherein the communication configuration comprises one or more of: a frequency bandwidth and set of time resources for receiving downlink signals from the BS, a schedule for reporting channel state on the uplink to the BS, a number of resources for transmitting sounding reference signals, or an uplink multiple-input multiple-output (MIMO) dimension for transmitting sounding reference signals.

12. The method of claim 1, further comprising receiving a downlink signal report from the UE, wherein the current channel state is based on the downlink signal report.

13. The method of claim 1, wherein the data rate parameter comprises a modulation and coding scheme index value.

14. The method of claim 1, wherein whether the current remaining available transmit power and the current channel state satisfy the condition is based on whether a correlation between a plurality of remaining available transmit powers and a plurality of channel states over time satisfy the condition, the plurality of remaining available transmit powers comprising the current remaining available transmit power and the plurality of channel states comprising the current channel state.

15. The method of claim 14, wherein the condition comprises if a rate of change of the plurality of remaining available transmit powers differs from a rate of change of the plurality of channel states by less than a threshold.

16. A base station (BS) comprising:
a memory; and
a processor coupled to the memory, the processor and the memory configured to:
   receive an indication of current remaining available transmit power from a user equipment (UE);
   communicate information indicating a data rate parameter and a communication configuration to the UE, wherein:
      the data rate parameter is for use by the UE on an uplink with the BS and the communication configuration affects uplink transmission duty cycle on the uplink;
      the data rate parameter and the communication configuration are based on whether the current remaining available transmit power and a current channel state between the BS and the UE satisfy a condition;
      when the condition is not satisfied, the data rate parameter is a first value corresponding to a first data rate parameter and the communication configuration is a first configuration corresponding to a first duty cycle; and
      when the condition is satisfied, the data rate parameter is a second value corresponding to a second data rate parameter and the communication configuration is a second configuration corresponding to a second duty cycle, wherein the first data rate parameter is greater than the second data rate parameter, and wherein the first duty cycle is less than the second duty cycle; and
   receive signals based on the data rate parameter and the communication configuration from the UE on the uplink.

17. The BS of claim 16, wherein the first configuration indicates to the UE to use a first frequency bandwidth and a first set of time resources for receiving downlink signals from the BS, wherein the second configuration indicates to the UE to use a second frequency bandwidth and a second set of time resources for receiving downlink signals from the BS, wherein the first frequency bandwidth is wider than the second frequency bandwidth, and wherein the second set of time resources span a greater time period than the first set of time resources.

18. The BS of claim 16, wherein the first configuration indicates to the UE to use a first schedule for reporting channel state on the uplink to the BS, wherein the second configuration indicates to the UE to use a second schedule for reporting channel state on the uplink to the BS, and wherein the second schedule indicates reporting more often than the first schedule.

19. The BS of claim 18, wherein the second schedule indicates periodic reporting and the first schedule indicates aperiodic reporting.

20. The BS of claim 18, wherein the first schedule indicates periodic reporting with a first periodicity and the second schedule indicates periodic reporting with a second periodicity that is greater than the first periodicity.

21. The BS of claim 16, wherein the first configuration indicates to the UE to use a first number of time resources for transmitting sounding reference signals, wherein the second configuration indicates to the UE to use a second number of time resources for transmitting sounding reference signals, and wherein the first number of time resources is less than the second number of time resources.

22. The BS of claim 16, wherein the first configuration indicates to the UE to use a first uplink multiple-input multiple-output (MIMO) dimension for transmitting sounding reference signals, wherein the second configuration indicates to the UE to use a second uplink MIMO dimension for transmitting sounding reference signals, and wherein the first uplink MIMO dimension is less than the second uplink MIMO dimension.

23. The BS of claim 16, wherein whether the current remaining available transmit power and the current channel state satisfy the condition is based on whether a comparison between a first delta value and a second delta value satisfy the condition, wherein the first delta value is based on a change between the current remaining available transmit power and a previous remaining available transmit power, and wherein the second delta value is based on a change between the current channel state and a previous channel state.

24. The BS of claim 23, wherein the condition comprises the first delta value minus a third delta value being less than the second delta value plus an error correction term, wherein the third delta value is based on a change in remaining available transmit power due to a change from a first modulation and coding scheme to a second modulation and coding scheme.

25. The BS of claim 23, wherein the first delta value and the second delta value are based on one or more conditions that are related in time.

26. The BS of claim 16, wherein the communication configuration comprises one or more of: a frequency bandwidth and set of time resources for receiving downlink signals from the BS, a schedule for reporting channel state on the uplink to the BS, a number of resources for transmitting sounding reference signals, or an uplink multiple-input multiple-output (MIMO) dimension for transmitting sounding reference signals.

27. The BS of claim 16, wherein the processor and the memory are further configured to receive a downlink signal report from the UE, wherein the current channel state is based on the downlink signal report.

28. The BS of claim 16, wherein the data rate parameter comprises a modulation and coding scheme index value.

29. The BS of claim 16, wherein whether the current remaining available transmit power and the current channel state satisfy the condition is based on whether a correlation between a plurality of remaining available transmit powers and a plurality of channel states over time satisfy the condition, the plurality of remaining available transmit powers comprising the current remaining available transmit power and the plurality of channel states comprising the current channel state.

30. The BS of claim 29, wherein the condition comprises if a rate of change of the plurality of remaining available transmit powers differs from a rate of change of the plurality of channel states by less than a threshold.

31. A base station (BS) comprising:
  means for receiving an indication of current remaining available transmit power from a user equipment (UE);
  means for communicating information indicating a data rate parameter and a communication configuration to the UE, wherein:
    the data rate parameter is for use by the UE on an uplink with the BS and the communication configuration affects uplink transmission duty cycle on the uplink;
    the data rate parameter and the communication configuration are based on whether the current remaining available transmit power and a current channel state between the BS and the UE satisfy a condition;
    when the condition is not satisfied, the data rate parameter is a first value corresponding to a first data rate parameter and the communication configuration is a first configuration corresponding to a first duty cycle; and
    when the condition is satisfied, the data rate parameter is a second value corresponding to a second data rate parameter and the communication configuration is a second configuration corresponding to a second duty cycle, wherein the first data rate parameter is greater than the second data rate parameter, and wherein the first duty cycle is less than the second duty cycle; and
  means for receiving signals based on the data rate parameter and the communication configuration from the UE on the uplink.

32. A non-transitory computer-readable medium that stores instructions that when executed by a base station (BS), cause the BS to perform operations a for wireless communication, the operations comprising:
  receiving an indication of current remaining available transmit power from a user equipment (UE);
  communicating information indicating a data rate parameter and a communication configuration to the UE, wherein:
    the data rate parameter is for use by the UE on an uplink with the BS and the communication configuration affects uplink transmission duty cycle on the uplink;
    the data rate parameter and the communication configuration are based on whether the current remaining available transmit power and a current channel state between the BS and the UE satisfy a condition;
    when the condition is not satisfied, the data rate parameter is a first value corresponding to a first data rate parameter and the communication configuration is a first configuration corresponding to a first duty cycle; and
    when the condition is satisfied, the data rate parameter is a second value corresponding to a second data rate parameter and the communication configuration is a second configuration corresponding to a second duty cycle, wherein the first data rate parameter is greater than the second data rate parameter, and wherein the first duty cycle is less than the second duty cycle; and
  receiving signals based on the data rate parameter and the communication configuration from the UE on the uplink.

33. The non-transitory computer-readable medium of claim 30, wherein whether the current remaining available transmit power and the current channel state satisfy the condition is based on whether a comparison between a first delta value and a second delta value satisfy the condition, wherein the first delta value is based on a change between the current remaining available transmit power and a previous remaining available transmit power, and wherein the second delta value is based on a change between the current channel state and a previous channel state.

34. The non-transitory computer-readable medium of claim 32, wherein the communication configuration comprises one or more of: a frequency bandwidth and set of time resources for receiving downlink signals from the BS, a schedule for reporting channel state on the uplink to the BS, a number of resources for transmitting sounding reference signals, or an uplink multiple-input multiple-output (MIMO) dimension for transmitting sounding reference signals.

35. The non-transitory computer-readable medium of claim 32, wherein the operations further comprise receiving a downlink signal report from the UE, wherein the current channel state is based on the downlink signal report.

36. The non-transitory computer-readable medium of claim 32, wherein the data rate parameter comprises a modulation and coding scheme index value.

\* \* \* \* \*